United States Patent
Lambert et al.

(10) Patent No.: US 9,100,773 B2
(45) Date of Patent: Aug. 4, 2015

(54) VERIFYING A WIRELESS DEVICE

(71) Applicants: Research In Motion Limited, Waterloo (CA); Certicom Corp., Mississauga (CA)

(72) Inventors: Robert John Lambert, Cambridge (CA); Neil Patrick Adams, Waterloo (CA); Ravi Singh, Toronto (CA); Salvatore Federico Barbieri, Ottawa (CA)

(73) Assignees: BlackBerry Limited, Waterloo, ON (CA); Certicom Corp., Mississauga, ON (CA)

( * ) Notice: Subject to any disclaimer, the term of this patent is extended or adjusted under 35 U.S.C. 154(b) by 222 days.

(21) Appl. No.: 13/690,001

(22) Filed: Nov. 30, 2012

(65) Prior Publication Data

US 2014/0154975 A1 Jun. 5, 2014

(51) Int. Cl.
 H04B 5/00 (2006.01)
 H04W 4/00 (2009.01)
 H04L 29/06 (2006.01)
 H04W 12/10 (2009.01)

(52) U.S. Cl.
 CPC ........... *H04W 4/008* (2013.01); *H04L 63/0492* (2013.01); *H04W 12/10* (2013.01); *H04L 63/126* (2013.01)

(58) Field of Classification Search
 CPC .................................................. H04W 72/04
 USPC ............................... 455/41.1–41.3
 See application file for complete search history.

(56) References Cited

U.S. PATENT DOCUMENTS

| 7,877,610 | B2 | 1/2011 | Vanstone et al. | |
|---|---|---|---|---|
| 8,750,514 | B2 * | 6/2014 | Gallo et al. | 380/271 |
| 2007/0106897 | A1 | 5/2007 | Kulakowski | |
| 2007/0136585 | A1 | 6/2007 | Diorio et al. | |
| 2010/0146273 | A1 * | 6/2010 | Kang et al. | 713/168 |
| 2012/0207305 | A1 | 8/2012 | Gallo et al. | |
| 2014/0068654 | A1 * | 3/2014 | Marlow et al. | 725/28 |

FOREIGN PATENT DOCUMENTS

WO 2013053788 4/2013

OTHER PUBLICATIONS

Lazaridis et al., "Data Integrity for Proximity-Based Communication," International Application No. PCT/US2011/043518, filed Jul. 11, 2011.
Lazaridis et al., "Data Integrity for Proximity-Based Communication," International Application No. PCT/US2011/043538, filed Jul. 11, 2011.

(Continued)

*Primary Examiner* — Tuan H Nguyen
(74) *Attorney, Agent, or Firm* — Fish & Richardson P.C.

(57) ABSTRACT

In some aspects of what is described here, a first wireless device detects proximity of a second wireless device (e.g., by a Near Field Communication (NFC) interface or another type of interface). Based on detecting proximity of the second wireless device, the first wireless device generates a recommendation request from information received from the second wireless device. The first wireless device sends the recommendation request to a trusted authority and receives a response. The response includes the trusted authority's recommendation whether to trust the second wireless device. The first wireless device can determine whether to trust the second wireless device based on the recommendation.

21 Claims, 3 Drawing Sheets

(56) References Cited

OTHER PUBLICATIONS

Federal Information Processing Standards Publication 180-2, "Secure Hash Standard," Aug. 1, 2002, 83 pages.

NFC Forum, Signature Record Type Definition, Technical Specification—Signature 1.0, 18 pages, dated Nov. 18, 2010.

National Institute of Standards and Technology, FIPS Pub 198: The Keyed-Hash Message Authentication Code (HMAC), URL: http://csrc.nist.gov/publications/fips/fips198/fips-198a.pdf, 20 pages, dated Mar. 6, 2002.

European Search Report issued in EP Application No. 12195002.6 on May 6, 2013, 5 pages.

Communication Pursuant to Article 94(3) EPC issued in European Application No. 12195002.6 on Nov. 21, 2013; 4 pages.

Communication Pursuant to Article 94(3) EPC issued in European Application No. 12195002.6 on Apr. 7, 2014; 4 pages.

* cited by examiner

VERIFYING A WIRELESS DEVICE

BACKGROUND

This specification relates to verifying a wireless device.

Some wireless devices include a near field communication (NFC) module that enables the wireless device to communicate wirelessly with other NFC-enabled components. For example, "tapping" an NFC-enabled wireless device to a passive NFC tag can cause the NFC tag to wirelessly transmit data to the wireless device. In some instances, an NFC tag sends the wireless device a uniform resource locator (URL) or other information.

BRIEF DESCRIPTION OF THE DRAWINGS

Like reference numbers and designations in the various drawings indicate like elements.

DETAILED DESCRIPTION

A wireless device that receives information from another wireless device can determine whether to trust the other wireless device. In some implementations, the wireless device can make such a determination before executing or otherwise processing the received information, which may help avoid risks associated with processing malicious information from untrusted devices. As an example, a Near Field Communication (NFC) reader can receive information from an NFC tag when the NFC reader detects proximity of the NFC tag. The reader can determine whether the tag is trustworthy by requesting a recommendation from a trusted authority. The reader may decide to process the information from the tag, for example, if the tag is verified to be trustworthy. The reader may ignore or discard the information from the tag, for example, if the information from the tag is malicious or if the tag is not a trusted device.

A verification mechanism can be established, for example, with one or more third-party authorities, for determining whether to trust wireless devices. In some implementations, a first wireless device can employ the service of a trusted authority and ask for a recommendation on whether to trust a second wireless device. For example, an NFC reader can employ the services of one or more trusted authorities to provide intelligence on whether or not the data sent by an NFC tag is trustworthy. The reader, having the recommendation of the authority (or recommendations from multiple authorities), can decide whether to risk performing further actions on the tag's data.

The verification mechanism does not necessarily require signatures or certificates stored in the NFC tags or elsewhere, which can reduce the memory requirement on the NFC tags and other devices. The data storage savings can be important, for example, for wireless devices (e.g., some NFC tags) with memory constraints, cost constraints, or other constraints, and in other environments. Moreover, in some implementations, verification can be implemented without having to distribute public/private key pairs or certificates.

In some implementations, the use of recommendations from trusted authorities can avoid burdens, difficulties, or costs associated with conventional verification techniques. For example, some of the costs associated with public key infrastructure (PKI) may be avoidable. In some environments, PKIs can be onerous to setup. For example, signatures on NFC data may consume a significant portion of the limited storage space on an NFC tag. The use of trusted authorities to verify wireless devices can have other benefits, which may be achieved in other environments and in other contexts.

Figure 1:
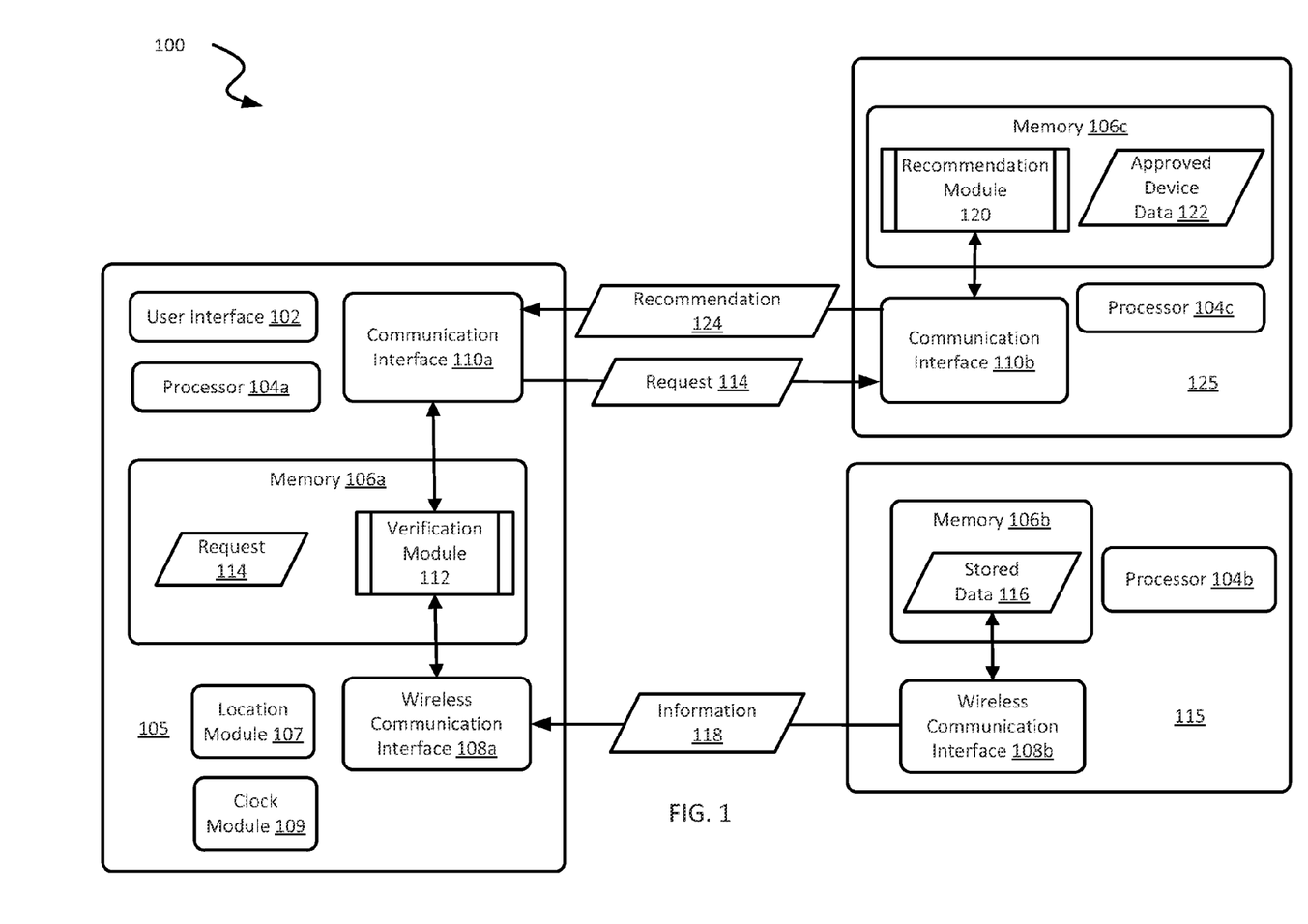
FIG. 1 is a schematic diagram of an example communication system.

FIG. 1 is a schematic diagram of an example communication system 100. The example communication system 100 includes two wireless devices 105, 115, and a computing system 125. The communication system 100 can include additional or different features and components. For example, the communication system 100 can include one or more networks, servers, computing systems, additional or different wireless devices, or any suitable combination of these and other components. The components of the communication system 100 can be configured as shown in FIG. 1, or the communication system 100 can be configured in another manner, as appropriate.

In some example implementations, the second wireless device 115 is a NFC tag, the first wireless device 105 is a smartphone containing a NFC interface, and the computing system 125 is a trusted authority server system. The smartphone and the NFC tag can communicate with each other using their respective NFC modules. The smartphone and the trusted authority can communicate with each over a telecommunication network or another type of connection. In some aspects, the smartphone, as a NFC reader, can detect proximity of the NFC tag and receive information from the NFC tag. To determine whether to trust the NFC tag or not, the smartphone may consult with the trusted authority to verify the integrity of the NFC tag. In some instances, the smartphone may send the trusted authority a request. In response to the request, the trusted authority may send to the smartphone a recommendation whether the NFC tag is trustworthy. The smartphone can then use the recommendation to determine whether or not to trust the NFC tag and further process the information received from the NFC tag.

Generally, the wireless devices 105 and 115 can be any devices that contain a wireless communication interface. The wireless devices 105 and 115 can include any appropriate types of subsystems, modules, devices, components, and combinations thereof. Examples of wireless devices include various types of mobile telecommunication devices, smartphones, smartcards, identification devices, media players, headsets, personal digital assistants (PDAs), laptops, notebooks, tablets, etc. The example communication system 100 can include additional or different types of devices, as appropriate. For example, in some implementations, another type of computing device can be substituted for one or both of the wireless devices 105 and 115.

Figure 2:
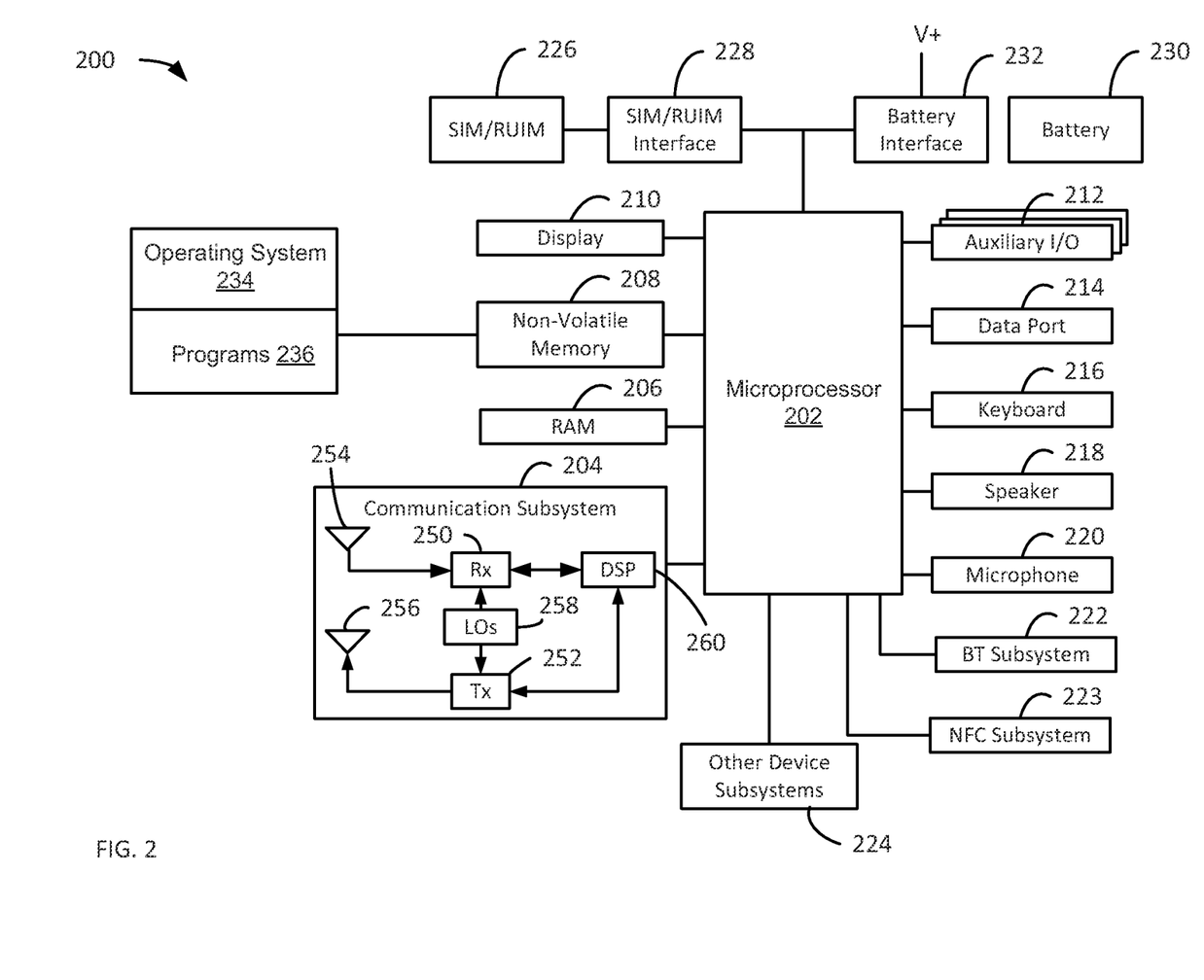
FIG. 2 is a schematic diagram of an example mobile telecommunication device.

In some implementations, the first wireless device 105 can be a mobile telecommunication device (e.g., the example mobile telecommunication device illustrated in FIG. 2), and the second wireless device 115 can be a proximity-activated device or another type of device that contains a proximity-based communication interface. A proximity-based communication device can include any appropriate types of subsystems, modules, devices, components, and combinations thereof.

One example of proximity-based communication is provided by Near Field Communication (NFC) technology. In some implementations, NFC technology enables data exchange between devices at a distance of approximately four to ten centimeters, at rates of approximately 100 kbps. NFC-enabled devices can be made to transfer information between devices by simply placing them near each other. For example, "tapping" or otherwise bringing two NFC-enabled devices within range of each other may cause one or both of the devices to send a message to the other device.

Some NFC-enabled devices include passive components. For example, some NFC tags operate passively, utilizing power received wirelessly from an active NFC device. Accordingly, some NFC devices can operate in a listening mode or another passive mode of operation. An NFC device operating in a listening mode can receive wireless signals transmitted by other NFC devices. The listening NFC device can respond by transmitting a signal that allows the other NFC device to detect proximity of the listening NFC device. The response can be generated based on energy extracted from the signal received by the listening NFC device, energy stored at the listening NFC device, or energy from other sources. In some instances, the wireless device 115 includes a passive NFC tag and the wireless device 105 includes an active NFC device. The wireless device 115 can utilize power received from the wireless device 105 for communications.

Some NFC-enabled devices include active components. For example, some NFC devices have an internal power source or they can be integrated into a device (e.g., a smartphone, a tablet, etc.) having an internal power source. Such active devices can operate in a listening mode as outlined above. Additionally or alternatively, an active NFC device can operate in a polling mode. An NFC device operating in a polling made can send periodic polling signals or other interrogation messages that allow other NFC devices to detect proximity of the polling NFC device. The polling NFC device can detect proximity of other NFC devices, for example, when the other NFC devices respond to the polling signal.

NFC-enabled devices communicate with each other wirelessly by electromagnetic signals. For example, some currently available NFC-enabled devices utilize radio frequency signals at or near 13.56 MHz. Whether two NFC-enabled devices detect proximity of each other can be a function of the effective range of their NFC modules and other factors. In various contexts, the effective range at which NFC modules can detect each other may depend, for example, on the power and frequency of the signals transmitted, the transmission environment, the orientation of the devices, and other considerations. For example, a listening NFC device may detect proximity of a polling NFC device when the listening NFC device receives a signal having a signal-to-noise ratio greater than a threshold level. Similarly, a polling NFC device may detect proximity of an another device when the polling NFC device receives a signal having a signal-to-noise ratio greater than a threshold level. Different NFC devices may have different effective ranges, and they may have different thresholds for detecting proximity of other devices. Moreover, proximity can be detected based on additional or different criteria. In some examples, NFC-enabled devices are configured to detect proximity of other NFC-enabled devices within a range of about four to ten centimeters. NFC-enabled devices can potentially be configured to detect NFC-enabled devices, or other types of devices, in a different range.

In some implementations, a device may detect proximity of another device based on additional or different techniques. For example, a device may include an accelerometer, a directional coupler, or a combination of these and other components that enhance proximity-detection features provided by NFC or another type of proximity-based wireless communication technology. In some instances, a device can detect proximity of another device based on physical contact between the devices. For example, some devices may include sensors that detect proximity of another device based on non-conductive contact, conductive contact (e.g., wires or leads), or another type of conductive or non-conductive contact with the other device.

The example first wireless device 105 shown in FIG. 1 includes a user interface 102, a processor 104a, a memory 106a, a location module 107 (e.g., global positioning system (GPS) module or another type of location module), a clock module 109, a wireless communication interface 108a and a communication interface 110a. The example second wireless device 115 shown in FIG. 1 includes a processor 104b, a memory 106b, and a wireless communication interface 108b. The wireless devices 105, 115 can include (individually or collectively) additional or different features or components. The features and components of the wireless devices 105, 115 can be configured as shown and described with respect to FIG. 1, or the features and components of the wireless devices 105, 115 can be configured in a different manner.

The user interface 102 of the wireless device 105 can include any suitable user interface devices or components. For example, the user interface 102 can include a touchscreen, a keyboard, a microphone, a pointing device (e.g., a mouse, a trackball, a stylus, etc.), or another type of user interface. The user interface 102 can detect a user interaction and generate computer-readable data or signals based on the user interaction. For example, the user interface may convert a user's keystrokes or other interactions to a voltage signal, and transmit the voltage signal to the processor 104, which can convert the voltage signals to binary information for storage or further processing.

The example location module 107 shown in FIG. 1 can include any apparatus with geo-positioning or location-detection capability, such as a location sensor. The location module 107 can be implemented by digital or analog circuitry with appropriate memory, processor, software, hardware, firmware or a combination of these and other types of apparatus. As a specific example, the location module 107 can be implemented as a built-in GPS chip or module in the first wireless device 105. The location module 107 can detect the location of the first wireless device 105 and output the location information to any processors or module as appropriate.

The example clock module 109 shown in FIG. 1 can include any apparatus that provides time data. The clock module 109 can be implemented by digital or analog circuitry with appropriate memory, processor, software, hardware, firmware or a combination of these and other types of apparatus. As a specific example, the clock module 109 can be the internal clock of the first wireless device 105. The clock module 109 can maintain or detect the current time and output the time information to any processors or module as appropriate.

In some implementations, the example wireless communication interfaces 108a, 108b shown in FIG. 1 are proximity-activated wireless interfaces. For example, the wireless communication interfaces 108a, 108b can be NFC interfaces or other types of proximity-activated wireless interfaces. Additional or different types of wireless interfaces, proximity-activated or otherwise, may be used. The wireless communication interfaces 108a, 108b may include, for example, a controller, a transceiver, and an antenna in any suitable configuration. The wireless communication interfaces 108a, 108b may include additional or different components. In some implementations, the wireless communication interfaces 108a, 108b are proximity-activated wireless interfaces. The wireless communication interface 108a of the first wireless device 105 can wirelessly communicate directly with the wireless communication interface 108b of the second wireless device 115. The wireless devices 105, 115 may include one or more additional wireless interfaces that communicate indirectly, for example, through a router, a hub, a relay, a gateway, or another type of intermediary component or device. As a specific example, in some implementations the wireless devices 105, 115 can communicate with each other indirectly over a data network or a telecommunications network.

The example wireless communication interface 108a, 108b can detect proximity of other suitable devices based on wireless interactions with the other devices. For example, the wireless interface may wirelessly transmit a polling signal or another type of interrogation message, and another device may receive the polling signal and transmit a response that can be detected by the wireless interface. As such, the wireless interface may detect proximity of another device based on the other device's response to a polling signal or another type of interrogation message. As another example, the wireless interface may wirelessly receive a polling signal or another type of interrogation message transmitted by another device. As such, the wireless communication interface 108 may detect proximity of another device based on a polling signal or other type of interrogation message transmitted by the other device. The wireless interface may detect proximity of another device based on additional or different techniques.

In some implementations, the first wireless device 105 can detect proximity of the second wireless device 115 based on wireless interactions between the wireless communication interfaces 108a, 108b. For example, if the first wireless device 105 and the second wireless device 115 are brought within a certain distance of each other, one or both of the wireless communication interfaces 108a, 108b may detect proximity of the other device. In some instances, the conditions under which one of the wireless devices detects proximity of the other may depend on settings or attributes of the particular wireless devices. For example, the wireless interfaces may detect proximity based on receiving signals having a signal-to-noise ratio greater than a threshold level. Moreover, the conditions under which proximity can be detected may depend on the physical orientations of the wireless devices 105, 115, physical attributes of their environment, and other considerations.

In some implementations, the wireless communication interface 108b of the second wireless device 115 can wirelessly transmit information 118 to the first wireless device 105. In some implementations, the second wireless device 115 wirelessly transmits the information 118 to the first wireless device 105 in response to detecting proximity of the first wireless device 105. In some instances, the second wireless device 115 can wirelessly transmit the information 118 to the first wireless device 105 based on additional or different criteria. Moreover, the second wireless device 115 may perform additional or different operations in response to detecting proximity of the first wireless device 105.

The information 118 can include any type of information appropriate for transmission by the wireless communication interface 108. For example, the information 118 can contain all or part of the stored data 116 of the second wireless device 115. The information 118 can include additional control information or instruction. For example, the information 118 may contain routing information for a link, an instruction on how to access or handle the stored data 116 (e.g., displaying the data in the user interface 102 of the first wireless device 105), or a combination of these and other types of information. In some instances, the information 118 does not necessarily include any of the stored data 116. Instead, the information 118 may serve as a cue or an instruction for an action that can be performed by the first wireless device 105.

The example processors 104a, 104b of the wireless devices can include any suitable data processing apparatus. For example, one or more aspects of a processor may be implemented by a microprocessor, a digital microcontroller, digital or analog circuitry, or a combination of these and other types of data processing hardware or firmware. The various processors 104a and 104b can be different types of data processing apparatus, or in some instances, similar processors can be used in different devices. In some implementations, one or both of the processors 104a, 104b includes a general purpose processor, a main processor, a co-processor, a combination of multiple data processing devices. In some instances, one or more components of a processor can be integrated or otherwise associated with another component of a wireless device or computing system.

In some implementations, a processor can execute instructions, for example, to generate output data based on data inputs. The instructions can include programs, codes, scripts or other types of data stored in memory. Additionally or alternatively, the instructions can be encoded as pre-programmed or re-programmable logic circuits, logic gates, or other types of hardware or firmware components. In some instances, a processor can generate output data by executing or interpreting software, scripts, programs, functions, executables, or other modules stored in memories. The processors may perform one or more of the operations shown in FIG. 3.

The example memories shown in FIG. 1 (106a, 106b, 106c) can include any suitable computer-readable media. For example, a memory can include a volatile memory device, a non-volatile memory device, or both. A memory can include one or more read-only memory devices, random-access memory devices, buffer memory devices, or a combination of these and other types of memory devices. In some instances, one or more components of the memory can be integrated or otherwise associated with another component of the wireless devices or the computing system.

In some implementations, a memory can store instructions (e.g., computer code) associated with an operating system, computer applications, or other resources. A memory may store application data and data objects that can be interpreted by one or more applications or virtual machines running on the wireless device or the computing system. In the example shown in FIG. 1, the example memory 106a of the first wireless device 105 includes a verification module 112 and a request 114; and the example memory 106b of the second wireless device 115 includes stored data 116. The memories 106a, 106b can include additional or different types of modules and data, as appropriate.

In some cases, the stored data 116 includes any information that is pre-loaded in the second wireless device 115. The stored data 116 may include information that is updated or modified from time to time. The stored data 116 can include a link, an identifier, a status report, an instruction, content such as, text data, image data, audio data, multimedia data, or a combination of these and other types of information. The link can be a link to content accessible by the Internet, a link to content accessible on a local area network, a link to content stored locally on wireless device 115, or another type of link. In some instances, the link can be in the form of a uniform resource locator (URL). The identifier can include information that identifies a location, address, component, and user of a device, or any attribute of the location, address, component, and users of the device. The status report can be, for example, a power level of the second wireless device 115, an indication whether the second wireless device 115 is functioning normally, or any other indication of any specific function of the wireless device 115.

In one aspect of operation, the second wireless device 115 detects proximity of the first wireless device 105 based on an interaction between the wireless interfaces of the wireless devices 105, 115. In response to detecting proximity of the first wireless device 105, the second wireless device 115 can send the information 118 to the first wireless device 105. In some instances, the second wireless device 115 generates the information 118 in response to detecting proximity of the first wireless device 105. The second wireless device 115 sends the information 118 to the first wireless device 105 by a wireless interaction between the wireless communication interfaces 108. In response to receiving the information 118, the first wireless device 105 can pass the information 118 to the verification module 112.

The verification module 112 can be implemented by hardware, software, firmware, or a combination thereof. For example, in some cases, all or part of the verification module 112 can be implemented as a software program executed by a microprocessor. As another example, in some cases, all or part of the verification module 112 can be implemented in digital or analog circuitry. In some instances, the verification module 112 is integrated with or utilizes other software or hardware resources of the wireless device, or the verification module 112 can be a standalone module. In some implementations, some or all operations of the verification module 112 can be executed by the processor 104a of the first wireless device 105, by the wireless communication interface 108a of the first wireless device 105, or by any suitable combination of these and other components of the wireless device.

In the example shown in FIG. 1, the verification module 112 can utilize the information 118 received from the second wireless device 115 in determining whether to trust the second wireless device 115. For example, the verification module 112 of the first wireless device 105 may utilize the information 118 to generate a request 114 that can be sent to a trusted authority to verify integrity of the information 118. The verification module 112 can use any suitable functions, operations, or algorithms to generate the request 114.

The verification module 112 can perform additional operations based on the recommendation 124 from the computing system 125, based on user input, or based on a combination of these and other types of information. In some implementations, the verification module 112 is configured to determine whether to trust the second wireless device 115 based on the recommendation 124. In implementations where there are multiple trusted authorities, the verification module 112 can decide whether to trust the second wireless device 115 based on recommendations received from multiple different trusted authorities.

The request 114 can include any type of information that can be used to verify integrity of the second wireless device 115. For example, in some implementations, the request 114 includes an authentication value. The authentication value can include information generated based on the information 118 received from the first wireless device 105, and possibly other information. As a specific example, the verification module 112 may check the location module 107 (e.g., GPS) of the first wireless device 105 and utilize the location information to generate the request 114. The location information of the first wireless device 105 can imply the location of the second wireless device 115 in the case where the second wireless device 115 is a proximity-activated device. As another example, the verification module 112 may check the clock module 109 of the first wireless device 105 and utilize the time information to generate the request 114. Based on the request containing the location information or time information (or both), the computing system 125 may determine the validity of the second wireless device 115, for example, if the information indicates an approved or trusted place or time (or both).

In some implementations, the authentication value includes a hash value generated based on the information 118, and possibly other information. The verification module 112 can use a cryptographic hash algorithm to generate the hash value, such as the SHA-1, SHA-2 or SHA-3 hash standards, or another type of algorithm. In some implementations, the authentication value is a Message Authentication Code (MAC). For example, a MAC may be generated by a keyed Hash-based Message Authentication Code (HMAC) algorithm, or another type of algorithm. In some cases, a MAC generated by an HMAC algorithm can be used to simultaneously verify integrity and authenticity of the underlying message. Additional or different types of authentication values may be used.

In some implementations, the request 114 may contain a truncated part of the hash value or MAC, depending on the length of the hash generated by the second wireless device 115. In some implementations, the request 114 may contain a subset or portions of the hash output. In some instances, the request 114 may include a subset or portions of unhashed raw data (e.g., the information 118), and possibly other information, as appropriate.

The first wireless device 105 can be provided a list of trusted authorities in advance, or may obtain such information from some other trustworthy source, or through some other reputation service dealing in the trustworthiness of hash authorities themselves. The first wireless device 105 can send the request 114 to one or more trusted authorities, to prompt the trusted authority for a recommendation whether to trust the second wireless device 115.

In one aspect of operation, the request 114 is transmitted to the computing system 125 by the communication interface 110a of the first wireless device 105. Based on the request 114, the computing system 125 can generate a recommendation 124 whether to trust the second wireless device 115 and send the recommendation 124 by the communication interface 110b to the first wireless device 105.

The example computing system 125 shown in FIG. 1 includes a processor 104c, a memory 106c, a communication interface 110b, and a recommendation module 120. The computing system 125 can be any computing apparatus such as a computer, a server, a union of computing resources, or any other appropriate apparatus. In some implementations, the computing system 125 can provide recommendations on the authenticity or reliability of a device. As an example, the computing system 125 can function as a "hash authority," providing recommendations whether to trust devices based on certain hash algorithms.

The communication interfaces 110a, 110b can include any suitable wireless interfaces or wire line interfaces. The communication interfaces 110a, 110b may include, for example, a controller, a transceiver, and a memory in any suitable configuration. The communication interfaces 110a, 110b may include additional or different components. In some implementations, the communication interface 110a of the first wireless device 105 and the wireless communication interface 108a of the first wireless device 105 can be the same communication interface. In some instances, the communication interfaces 110a and 110b can communicate indirectly, for example, through a router, a hub, a relay, a gateway, or another type of intermediary component or device. As a specific example, in some implementations the wireless device 105 and the computing system 125 can communicate with each other indirectly over a data network or a telecommunications network (e.g., an ad-hoc network, a WiFi network, a local area network, a GSM/GPRS network, a LTE/LTE-Advanced network, etc.) In some implementations, the communication link can include wire line interfaces such as fiber optical communication interface, power line communications interface, USB interface, and other possible interfaces that allow data communications between the first wireless device 105 and the computing system 125.

In some implementations, the request 114 may be encrypted before transmission to the computing system 125. The encryption can provide confidentiality in the data communications between the wireless device 105 and the computing system 125. For example, the request 114 can be sent to the computing system 125 encrypted by the authority's public key, or with a symmetric key shared by the wireless device 105 and the computing system 125. Upon the receipt of the encrypted request 114 at the computing system 125, the encrypted request 114 can be unencrypted using the corresponding key. In some implementations, the communications interface 110 may be secured with SSL/TLS, which can provide confidentiality of the request 114, as well as authentication of the computing system 125. In another example, the communication interface 110 may be built on a virtual private network (VPN) tunnel that connects the wireless device 105 and the computing system 125.

The example processor 104c shown in FIG. 1 can include, for example, a main processor, a coprocessor, a combination of multiple data processing devices. Additionally or alternatively, the processors 104c can include one or more special purpose processors, such as, for example, a cryptographic processor, an authentication processor, or another type of special purpose processor. In some implementations, one or more aspects of the processor 104c may be implemented by a microprocessor, a digital microcontroller, digital or analog circuitry, or a combination of these and other types of data processing hardware or firmware. In some instances, one or more components of a processor can be integrated or otherwise associated with another component of the computing system 125.

In some implementations, the processor 104c can execute instructions. The instructions can include programs, codes, scripts or other types of data stored in memory. Additionally or alternatively, the instructions can be encoded as pre-programmed or re-programmable logic circuits, logic gates, or other types of hardware or firmware components. The processor 104c can execute or interpret software, scripts, programs, functions, executables, or other modules stored in memory. For instance, the processor 104c can execute instructions so that one or more components of the computing system 125 can function together. In some instances, the processor 104c may perform one or more of the operations shown in FIG. 3.

The example memory 106c shown in FIG. 1 includes a recommendation module 120 and approved device data 122. The recommendation module 120 can generate a recommendation whether to trust the second wireless device 115. In the example shown in FIG. 1, the recommendation module 120 uses the request 114 transmitted from the first wireless device 105 to generate the recommendation 124.

The recommendation module 120 can be implemented by hardware, software, firmware, or a combination thereof. For example, in some cases, all or part of the recommendation module 120 can be implemented as a software program executed by a microprocessor. As another example, in some cases, all or part of the recommendation module 120 can be implemented in digital or analog circuitry. In some instances, the recommendation module 120 is integrated with or utilizes other software or hardware resources of the wireless device, or the recommendation module 120 can be a standalone module. In some implementations, some or all operations of the recommendation module 120 can be executed by the processor 104c, by the communication interface 110b of the computing system 125, or by any suitable combination of these and other components of the computing system 125.

The approved device data 122 can include, for example, a database that includes a list of approved devices (e.g., a list of registered NFC tags, etc.). The approved devices may be trusted devices, for example, devices that are registered with or certificated by the computing system 125 or some other authority. The approved device data 122 can indicate attributes of the approved device. The approved device data 122 can be pre-loaded in the computing system 125. The approved device data 122 may be updated or modified, for example, periodically or at specified times. In some instances, new devices may be added to the list of approved devices based on the recommendation provided by the computing system 125 or by other trusted authorities in the communication system 100. In some implementations, the first wireless device 105 may send back a final decision (not shown) on whether to trust the second wireless device 115. The authority can update or modify the database of approved devices, for example, based on the decision of the first wireless device 105 or other actions in the communication system 100.

The recommendation module 120 can use any suitable functions, operations, or algorithms to verify integrity of the second wireless device 115 based on the request 114. In some implementations, the recommendation module 120 can compare information in the request 114 with the approved device data 122 and then generate a recommendation 124 based on the comparison. As a specific example, the authority can compare the data in the request 114 with the approved device data 122. If the data in the request 114 matches an approved device, the recommendation module 120 can generate a recommendation 124 indicating that the second wireless device 115 is trustworthy. As another example, if the request 114 contains location information, the recommendation module 120 may analyze the location information by comparing it with the location attributes of approved devices stored in the approved device data 122. If a match is found, the recommendation module 120 can recommend trusting the second wireless device 115.

The recommendation 124 can include a binary indicator whether to trust the second wireless device 115, a percentage reliability of the second wireless device 115, an indicator of which components of the information 118 transmitted by the second wireless device 115 are trustworthy, or some other recommendation data. Additionally or alternatively, the recommendation 124 can include supplementary information which might not have fit on the second wireless device 115 itself, or may provide some updated information. For example, the recommendation 124 may include an instruction for the first wireless device 105. In this case, the information 118 transmitted by the second wireless device 115 may act more as a cue for a certain location or action.

In some implementations, the recommendation 124 may be valid only for a certain time. The valid time duration may be, for example, the time for which an advertiser has paid a subscription. The valid time duration can be predetermined and known by the computing system 125 and the first wireless device 105, or it can be sent as additional information associated with the recommendation 124. The computing system 125 can revoke its recommendation regarding the whole, or certain component of the information 118 transmitted by the second wireless device 115. In some implementations, the revocation of the recommendation may be passive. In such cases, responses to new requests for recommendations may include information indicating that a previous recommendation has been revoked. In some other implementations, the revocation can be active, where the computing system 125 takes an active part in sending revised recommendation to the first wireless device 105 that previously requested recommendations. In other implementations, the computing system 125 may employ a hybrid revocation strategy, where some active information on a recommendation is sent and some other recommendation information remains passive and is not sent by the computing system 125.

In one aspect of operation, after receiving the recommendation 124 by the communication interface 110a, the first wireless device 105 can decide whether to trust the second wireless device 115 based on the recommendation 124 and act accordingly based on the decision. As a specific example, if the recommendation is a binary indicator saying the second wireless device 115 is valid, the first wireless device 105 can trust the second wireless device 115 and may follow the instruction contained in the information 118 to, for example, access a URL, display the information in the user interface 102, or any other possible instructions. If the binary indicator suggests the second wireless device 115 is not valid, then the first wireless device may delete (or otherwise discard or ignore) the information 118 received from the second wireless device 115. Additionally, the first wireless device 105 may add the second wireless device 115 into a blacklist and stop receiving information from the second wireless device 115.

FIG. 2 is a schematic diagram of a mobile telecommunication device 200. For example, the mobile telecommunication device 200 can be a BLACKBERRY® telecommunication device or another type of mobile telecommunication device. In some implementations, the mobile telecommunication device 200 is a dual-mode device. The example mobile telecommunication device 200 in FIG. 2 includes a microprocessor 202, a communication subsystem 204, random access memory (RAM) 206, non-volatile memory 208, a display 210, one or more auxiliary input/output (I/O) devices 212, a data port 214, a keyboard 216, a speaker 218, a microphone 220, a Bluetooth subsystem 222, a Near Field Communication (NFC) subsystem 223, other device subsystems 224, a SIM/RUIM card (i.e., a Subscriber Identity Module or a Removable User Identity Module) 226, a SIM/RUIM interface 228, a rechargeable battery 230, a battery interface 232, and possibly other components. The mobile telecommunication device 200 can include the same, additional, or different features, which may be arranged or configured to operate in the manner shown or in a different manner.

The example mobile telecommunication device 200 is a battery-powered device that includes a battery interface 232 that receives direct current electrical power from one or more rechargeable batteries 230. The battery 230 can be a smart battery with an embedded microprocessor or a different type of battery. The battery interface 232 may be coupled to a regulator (not shown), which may assist the battery 230 in providing power V+ to the mobile telecommunication device 200. Additionally or alternatively, the mobile telecommunication device 200 may receive power from an external source (e.g., an alternating current power source, an adapter, a converter, etc.) or a different type of internal power source.

The example mobile telecommunication device 200 shown in FIG. 2 can operate as a two-way communication device having voice and data communication capabilities. The mobile telecommunication device 200 may communicate over wireless networks, including wireless telecommunication networks, wireless data networks, combined voice and data networks, or other types of wireless networks. Thus, the mobile telecommunication device 200 may communicate over a voice network, such as any of the analog or digital cellular networks, and may also communicate over a data network. Voice and data networks may be implemented as separate communication networks using separate infrastructure, such as base stations, network controllers, etc., or the voice and data networks may be integrated into a single wireless network. The networks can include one or more local, regional, national, or global networks. The networks can include one or more cellular networks. In some implementations, wireless networks utilize one or more communication protocol standards, for example, 3G, 4G, GSM, CDMA, GPRS, EDGE, LTE or others.

In the example mobile telecommunication device 200 shown in FIG. 2, the communication subsystem 204 includes a receiver 250, a transmitter 252, antennae 254 and 256, one or more local oscillators 258, a digital signal processor (DSP) 260 and possibly other features. The antennae 254 and 256 may include antenna elements of a multiple-element antenna, embedded antennae, radio frequency (RF) antennae, or other types of antennae. The communication subsystem 204 can be used to communicate with a network. The DSP 260 can be used to receive and send signals through the receiver 250 and the transmitter 252, respectively, and the DSP 260 can provide control information to the receiver 250 and the transmitter 252. For example, the gain levels applied to communication signals in the receiver 250 and the transmitter 252 can be adaptively controlled through automatic gain control algorithms implemented in the DSP 260. Additional or different types of control algorithms may be implemented in the DSP 260 to provide more sophisticated control of the communication subsystem 204.

In some implementations, the local oscillator 258 includes a single local oscillator that provides a reference signal for the receiver 250 and the transmitter 252, for example, where voice and data communications occur at a single frequency, or closely-spaced sets of frequencies. In some cases, for example if different frequencies are utilized for voice communications and data communications, the local oscillator 258 may include multiple local oscillators that are used to generate multiple different frequencies corresponding to the voice and data networks. Information, which may include both digital voice and digital data information, can be communicated within the mobile telecommunication device 200 to and from the communication subsystem 204 through a link or bus between the DSP 260 and the microprocessor 202. The design and configuration of the communication subsystem 204, such as frequency band, component selection, power level, etc., may depend on the communication network in which the mobile telecommunication device 200 is intended to operate. For example the communication subsystem 204 may be configured for 2G, 2.5G, 3G, 4G, and other voice and data networks, such as GSM, CDMA2000, GPRS, EDGE, W-CDMA (UMTS), OFDM/OFDMA, EV-DO, TD-SCDMA, HSPA, HSOPA, and the like.

After any required network registration or activation procedures have been completed, the mobile telecommunication device 200 may send and receive communication signals, including both voice and data signals, over the wireless networks. Signals received by the antenna 254 from the communication network can be routed to the receiver 250, which can provide signal amplification, frequency down conversion, filtering, channel selection, etc., and may also provide analog to digital signal conversion. Analog to digital conversion of the received signal may allow the resulting digital signal to be decoded by the DSP 260. Signals to be transmitted to the network can be processed (e.g., modulated, encoded, etc.) by the DSP 260 and then provided to the transmitter 252 for digital to analog conversion, frequency up conversion, filtering, amplification and transmission to the communication network via the antenna 256.

In some implementations, the mobile telecommunication device 200 can send and receive communication signals over the wireless network after wireless network registration or activation procedures have been completed. The wireless network registration or activation procedures for the mobile telecommunication device 200 may vary based on the type of network or networks with which the mobile telecommunication device 200 operates. Wireless network access for the example mobile telecommunication device 200 shown in FIG. 2 can be associated with a subscriber or user of the mobile telecommunication device 200. In particular, the SIM/RUIM card 226 in the SIM/RUIM interface 228 may identify the subscriber or user of the mobile telecommunication device 200. The SIM/RUIM card 226 in the SIM/RUIM interface 228 may enable access to subscribed services through the wireless network. For example, subscribed services may include web browsing, e-mail, voice mail, Short Message Service (SMS), Multimedia Messaging Services (MMS), or others. The SIM/RUIM card 226 in the SIM/RUIM interface 228 can communicate with the microprocessor 202 on the mobile telecommunication device 200. To identify the subscriber, the SIM/RUIM card 226 may include user parameters, such as an International Mobile Subscriber Identity (IMSI) or another type of subscriber identifier. The SIM/RUIM card 226 may store additional or different subscriber information, including calendar information, call log information, contacts information, or other types of information. Additionally or alternatively, user identification information can also be stored in the non-volatile memory 208.

The data port 214 may include a serial port, a parallel port, or another type of connection port. In some implementations, the data port 214 is a Universal Serial Bus (USB) port that includes data lines for data transfer and a supply line that can provide a charging current to charge the battery 230 of the mobile telecommunication device 200. The mobile telecommunication device 200 may be manually synchronized with a host system, for example, by connecting the mobile telecommunication device 200 through the data port 214 (e.g., in an interface cradle or another type of wired connection) that couples the mobile telecommunication device 200 to a data port of a computer system or other device. The data port 214 may also be used to enable a user to set preferences through an external device or software application, or to download other programs for installation. The wired connection of the data port 214 may be used to load an encryption key onto the device.

The Bluetooth subsystem 222 and the NFC subsystem 223 each provide for communication between the mobile telecommunication device 200 and different systems or devices, without the use of the wireless network. For example, Bluetooth subsystem 222 and the NFC subsystem 223 can include radio frequency devices and associated circuits and components for short-range communication. The mobile telecommunication device 200 can include additional or different types of short-range communication subsystems. For example, the mobile telecommunication device 200 can include an infrared communication subsystem, a WiFi communication subsystem, or another type of short-range communication subsystem. In some implementations, one or more of the short-range communication subsystems can be configured according to one or more standards or other types of specifications. Examples of short-range communication standards include standards developed by the Infrared Data Association (IrDA), BLUETOOTH®, the 802.11 family of standards developed by IEEE, the NFC Forum, and others.

The Bluetooth subsystem 222 can include, for example, a controller module, a transceiver module, an antenna, or any suitable combination of these and other components. The Bluetooth subsystem 222 can be configured to send and receive messages according to any appropriate standard or specification for Bluetooth devices. In some implementations, the Bluetooth subsystem 222 can be configured to communicate by wireless signals having one or more frequencies in a range of 2400 MHz to 2480 MHz, or in another frequency range. The Bluetooth subsystem 222 can be configured to communicate with other Bluetooth-enabled devices.

The NFC subsystem 223 can include, for example, a controller module, a transceiver module, an antenna, or any suitable combination of these and other components. The NFC subsystem 223 can be configured to send and receive messages according to any appropriate standard or specification for NFC devices. In some implementations, the NFC subsystem 223 can be configured to communicate by wireless signals having one or more frequencies at or near 13.56 MHz, or in another frequency range. The NFC subsystem 223 can be configured to detect proximity of NFC tags and other NFC-enabled devices. The NFC subsystem 223 can be configured to communicate with the NFC tags and other NFC-enabled devices, for example, in response to detecting their proximity or in response to other events or criteria.

The example microprocessor 202 can manage and control the overall operation of the mobile telecommunication device 200. Many types of microprocessors or microcontrollers may be used, as appropriate. Additionally or alternatively, a single DSP 260 may be used to carry out one or more functions of the microprocessor 202. Low-level communication functions, including data and voice communications, may be performed through the DSP 260 in the communication subsystem 204. High-level communication applications, such as voice communication applications, data communication applications, or other types of software applications may be stored in the non-volatile memory 208 for execution by the microprocessor 202. The microprocessor 202 can interact with other device subsystems, such as the display 210, the RAM 206, the auxiliary input/output (I/O) devices 212, the data port 214, the keyboard 216, the speaker 218, the microphone 220, the SIM/RUIM interface 228, the battery interface 232, the Bluetooth subsystem 222, the NFC subsystem 223, and any other device subsystems generally designated as 224.

The non-volatile memory 208 includes erasable persistent storage, for example, flash memory, battery-backed-up RAM, or other types of memory. In the example shown in FIG. 2, the non-volatile memory 208 stores instructions and data associated with an operating system 234, programs 236 that provide various types of functionality for the mobile telecommunication device 200, and other types of information. The non-volatile memory 208 may include a file system to facilitate storage of data items on the device. For example, the operating system 234, the programs 236, or other modules executed on the microprocessor 202 may store, retrieve, modify, delete, or otherwise manipulate data by accessing (e.g., read, write, etc.) the file system provided on the non-volatile memory 208.

Data stored in the non-volatile memory 208 or other computer-readable media on the mobile telecommunication device 200 may include user application data, text files, image files, voicemail data, and other data generated by the user at the mobile telecommunication device 200 or received and stored by the mobile telecommunication device 200. The user application data may include, for example, e-mail message data, address book data, contact information data, calendar appointment data, instant message data, SMS message data, voicemail data, user-entered data, or other types of application data. Voicemail data may include digitized audio recordings or stub entries available for viewing in a messaging application indicating the availability of a voicemail message stored at another location. User-entered data may include text-based, graphic, or other multimedia files loaded onto the mobile telecommunication device 200 by the user.

The operating system 234 can control low-level functions of the mobile telecommunication device 200 and facilitate operation of the programs 236. For example, the operating system 234 may provide an interface between one or more of the programs 236 and one or more hardware components on the mobile telecommunication device 200. The programs 236 include computer program modules that can be executed by the microprocessor 202 (or the DSP 260 in some instances). In some implementations, one or more of the programs 236 are executed by the microprocessor 202 and provide a high-level interface between a user and the mobile telecommunication device 200. The user interface provided by a program 236 typically includes a graphical component provided through the display 210, and may additionally include an input/output component provided through the auxiliary I/O devices 212, the keyboard 216, the speaker 218, or the microphone 220. The operating system 234, specific device applications or programs 236, or parts thereof, may be temporarily loaded into a volatile store, such as RAM 206, for faster operation. Moreover, received communication signals may also be temporarily stored to RAM 206 before they are permanently written to a file system in the non-volatile memory 208.

The programs 236 stored in the non-volatile memory 208 may include, for example, a message application, a calendar application, one or more third party applications, and other types of applications. The programs 236 may include additional or different modules, programs, or applications, such as, for example, a Personal Information Manager (PIM) module, a connect module, a device state module, an IT policy module, a multi service platform manager, or others. The programs 236 may include programs that control basic device operations, which may be installed on the mobile telecommunication device 200 during its manufacture or initial configuration. Other types of software applications, such as, for example, third party applications or other types of modules, may be added after the manufacture and initial configuration of the mobile telecommunication device 200. Examples of third party applications include games, utilities, internet applications, etc. Generally, any of the programs 236 may be updated or modified at any time. The additional applications or updates to applications can be loaded onto the mobile telecommunication device 200 through the wireless network, the auxiliary I/O devices 212, the data port 214, the Bluetooth subsystem 222, the NFC subsystem 223, or any other suitable device subsystem 224. The non-volatile memory 208 may also store keys, which may include encryption and decryption keys and addressing information for use in communicating between the mobile telecommunication device 200 and servers.

Figure 3:
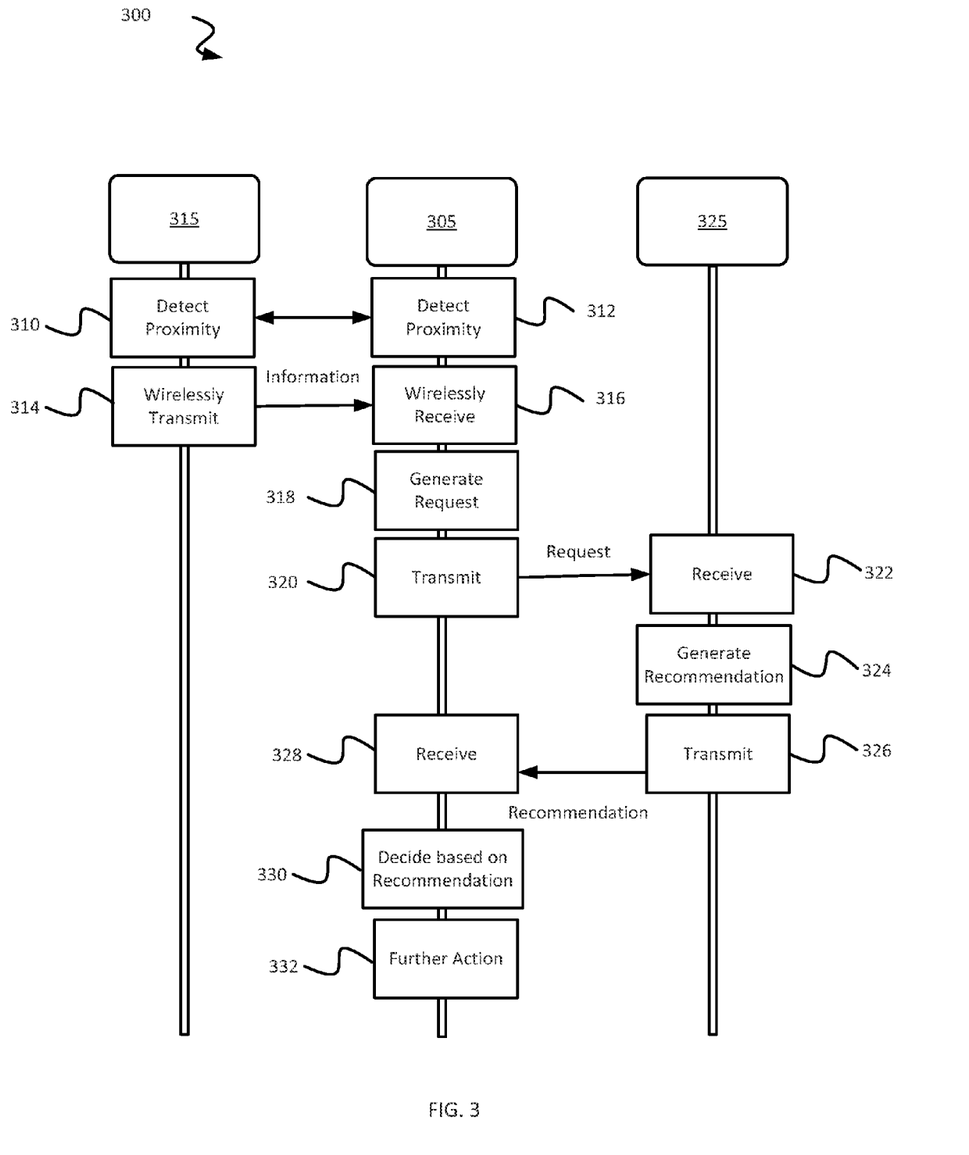
FIG. 3 is a signaling and flow diagram showing an example technique for communication among devices.

FIG. 3 is a signaling and flow diagram showing an example process 300 for communication among devices. The process 300 can be implemented in a communication system. For example, the process 300 can be implemented by one or more components of the communication system 100 shown in FIG. 1, or by a different type of system. The example process 300 shown in FIG. 3 can be modified or reconfigured to include additional, fewer, or different operations, which can be performed in the order shown or in a different order. In some instances, one or more of the operations can be repeated or iterated, for example, until a terminating condition is reached. In some implementations, one or more of the individual operations shown in FIG. 3 can be executed as multiple separate operations, or one or more subsets of the operations shown in FIG. 3 can be combined and executed as a single operation.

Three devices 305, 315, 325 are shown in FIG. 3. The devices 305, 315, 325 may include wireless devices, computing systems, or any suitable combination of these and other types of devices. For example, the devices 305, 315, and 325 can be the wireless devices 105, 115, and the computing system 125 of FIG. 1, respectively, or other suitable devices. In some implementations, the first device 305 can be a mobile telecommunication device, a laptop computer, a speakerphone device, a tablet device, a headset device, or another type of device. In some implementations, the second device 315 can be an NFC tag, a mobile telecommunication device, a laptop computer, a speakerphone device, a tablet device, a headset device, or another type of device. In the discussion that follows, operations shown in FIG. 3 are described as being performed by the first device 305, the second device 315, the third device 325, or a subset of them. In some implementations, one or more individual operations shown in FIG. 3 can be performed by one or more additional or different devices, or one or more of the operations that are shown as being performed by a combination of devices can be performed by a single device. As such, the example process 300 can be modified or reconfigured, as appropriate, for various types of implementations and in multiple different contexts.

At 310 and 312, the second device 315 and the first device 305 detect proximity of each other. The second device 315 and the first device 305 may detect proximity of each other based on physical proximity of the two devices and possibly other criteria. For example, the first device 305 may detect proximity of the second device 315 based on the second device 315 moving within a detection range (e.g., 4 cm, 10 cm, 20 cm, etc.) of the first device 305. In some cases, the first device 305 detects proximity of the second device 315 based on a direct wireless interaction between the devices. In some implementations, the first device 305 detects proximity of the second device 315 by a proximity-activated wireless interface. For example, the proximity-activated wireless interface can be an NFC interface, or another type of interface. In some implementations, the first device 305 detects proximity of the second device 315 based on information transmitted wirelessly from the second device 315 directly to the first device 305.

In some implementations, at 310 and 312 the second device 315 wirelessly transmits information that permits the first device 305 to detect proximity of the second device 315. For example, in some implementations, the second device 315 transmits a polling signal within range of the first device 305, and the first device 305 detects proximity of the second device 315 by receiving the polling signal. As another example, in some implementations, the second device 315 receives a polling signal from the first device 305, the second device 315 transmits a response to the polling signal within range of the first device 305, and the first device 305 detects proximity of the second device 315 by receiving the response. The second device 315 may transmit additional or different types of information to permit the first device 305 to detect proximity of the second device 315.

At 314, the second device 315 wirelessly transmits information to the first device 305. The information can include any type of information stored on the second device 315, any type of information received by the second device 315 from another source, or a combination. In some cases, the information is generated by the second device 315 in response to detecting proximity of the first device 305. For example, the second device 315 may generate alerts, instructions, or other types of messages to be sent to the first device 305. In some cases, the information contains data stored in the second device 315.

In some implementations, the information includes a link to content, routing information for a link, an instruction, or other types of information. As an example, if the second device 315 detects proximity of the first device 305 while the first device stores a link to content in its memory, the second device 315 may generate information that conveys the link (e.g., a URL) to the first device 305 so that the link can be opened on the first device 305 or may direct the first device 305 to access a server or database. In some examples, the information contains instruction such as displaying or highlighting the link or the content directed by the link in a graphical display of the first device 305. As another example, if the second device 315 detects proximity of the first device 305, the second device 315 may generate information that acts as a cue for a certain location or action so that the information can trigger the first device 305 to perform certain action.

At 316, the first device 305 wirelessly receives the information from the second device 315. In some instances, the information is received at the first device 305 directly from the second device 315 in response to the first device 305 transmitting information that permits the second device 315 to detect proximity of the first device 305. In some implementations, the information is wirelessly received by a proximity-based wireless interface of the first device 305 (e.g., an NFC interface or another type of interface).

At 318, the first device 305 generates a recommendation request based on detecting proximity of the second device 315. The recommendation request can be generated based on other events or criteria. For example, the recommendation request can be generated based on detecting proximity of the second device 315 at a specified time or place, based on user input, based on establishing network connectivity, or based on a combination of these and other factors. In some implementations, the request is generated from the information received from the second device 315 (at 316). For example, the request may include an authentication value generated by a function or algorithm, and the function or algorithm may use all or part of the information as input. In some instances, the first device 305 generates a hash value from all or part of the information received from the second device 315, for example, using a specified hash algorithm such as SHA-1, SHA-2, SHA-3, or another algorithm. In some instances, the recommendation request contains all or part of the information received from the second device 315, and possibly other information. As an example, the recommendation request may include the location information acquired by a location sensor (e.g., GPS, or another location sensor) in the first device 305. As another example, the recommendation request may include the time information generated by a clock module in the first device 305. In some implementations, the recommendation request can be generated by a verification module (e.g., the verification module 112 of FIG. 1) of the first device 305.

At 320, the first device 305 sends the recommendation request to the third device 325. The third device 325 can be a trusted authority, which may be implemented, for example, as a server, a server cluster, or another type of computing system provided by a trusted third party. In some implementations, the recommendation request is sent to the third device 325 by a communication interface of the first device 305. For example, the recommendation request can be sent over a wireless network or another type of communication link.

In some implementations, the first device 305 may have a list of trusted authorities (e.g., stored in local memory, accessed on the Internet, etc.), and the first device 305 can choose one or more of the trusted authorities from the list. In some cases, the trusted authority may be responsible for verification of a certain type of device (e.g., NFC tags, NFC tags made by a specified manufacturer, etc.) based on some taxonomy. In some cases, multiple trusted authorities can overlap in the devices that they can provide assurance on.

In some implementations, the first device 305 obtains information about trusted authorities from other resources. For example, the first device 305 may obtain such information through other reputation services dealing in the trustworthiness of the trusted authorities themselves. In some implementations, the first device 305 may know about a trusted authority (such as its identification, or address, or another attribute) from the information received from the second device 315 (at 316). As a specific example, the information about the trusted authority can be included as a prefix or suffix in the information received from the second device 315 (at 316). As another example, the first device 305 may recognize which trusted authority to send the recommendation request according to the content included in the information received from the second device 315 (at 316).

At 322, the third device 325 receives the recommendation request from the first device 305. In some instances, the recommendation request is received by a communication interface of the third device 325. For example, the first device 305 and the third device 325 may communicate over a wireless network. In some implementations, the wireless network can include a telecommunication network or a local area network implementing a communication standard (e.g., WiFi, WiMax, LTE/LTE-Advanced). In some instances, the devices can communicate over the Internet, possibly through a router, a hub, a relay, a gateway, or another type of intermediary component or device.

In some implementations, the recommendation request is encrypted before transmission to the third device 325. For example, the recommendation request can be sent to the third device 325 encrypted by the authority's public key, or with a symmetric key shared by the first device 305 and the third device 325. In some instances, the communications interface may be secured with SSL/TLS, which can provide confidentiality of the recommendation request, as well as authentication of the third device 325. In another example, the communication interface may be built on a virtual private network (VPN) tunnel.

At 324, the third device 325 generates, based on the request from the first device 305, a recommendation whether to trust the second device 315. The recommendation can be generated, for example, according to a function or algorithm. For instance, the function or algorithm may correspond to the function or algorithm used by the first device 305 in generating the recommendation request, such as certain hash algorithms or encryption algorithms. In some implementations, the recommendation can be generated by a recommendation module (e.g., the recommendation module 120 of FIG. 1, etc.) of the third device 325.

In some implementations, the third device 325 has a database of trusted devices (e.g., the approved device data 122 of FIG. 1, etc.). The third device 325 can compare information in (or information derived from) the recommendation request to the database, and generate the recommendation based on the comparison. As a specific example, if the recommendation request contains location information, the third device 325 may check whether the location information corresponds to a trusted device or a trusted location, and generate a recommendation based on the check result. As another example, if the recommendation request contains time information, the third device 325 may check whether the time information corresponds to a time when the second device 315 is considered trustworthy, and generate a recommendation based on the check result. As another example, if the recommendation request contains a hash value, the third device 325 can compare the hash value with those of the trusted devices. If a match is found, the third device 325 can generate a recommendation indicating that the first device is trustworthy.

The recommendation can include an indicator or information regarding trustworthiness of a device. In some implementations, the recommendation includes a binary indicator whether to trust the second device 315. As a specific example, the binary indicator can be included in the recommendation using one bit (e.g., where "1" means the second device 315 is trustworthy and "0" means the second device 315 is not trustworthy). In some implementations, the recommendation includes a percentage reliability of the second device 315. For example, the percentage reliability may be a similarity quantifier of the information in recommendation request relative to the information in the database of trusted devices. As a particular example, a percentage reliability of "100%" can indicate that a perfect match is found in the database and hence the second device 315 is trustworthy; and a percentage reliability of "80%" may indicate that the information in recommendation request is 80% similar to certain information of a trusted device, and the certainty that the first device is trustworthy is 80%.

In some implementations, the recommendation includes other types of indicia or information. For example, the recommendation can contain multiple components, where each component indicates whether to trust a portion of the information from the first device. The recommendation components can be identical, similar, or different. In some implementations, the recommendation can contain supplementary information which might not have fit on the first device itself. In some instances, the recommendation may contain updated information.

In some implementations, the third device 325 may not be able to determine whether a device is trustworthy based on the recommendation request received from the second device (at 322). For example, in some cases, the recommendation request contains information that points to two or more possible items on which the third device 325 could provide a recommendation. The third device 325 may or may not need further information to disambiguate the recommendation request from the first device 305. In some instances, the third device 325 may request from the first device 305 some supplementary information, such as all or part of the raw (e.g., unhashed) information received from the second device 315 (at 316), or other information. In some implementations, the first device 305 sends the additional information indicated by the third device 325, or additional information chosen by the first device 305, to the third device 325. When the third device 325 has sufficient information to make a recommendation, the third device 325 can provide the recommendation to the first device 305. For example, the recommendation can be based on the recommendation request received from the first device 305 (at 322), any subsequently-received additional information, or a combination of them.

In some implementations, the recommendation can be time-sensitive. In some instances, the recommendation may be valid for certain time duration. As a specific example, if the first device is a NFC tag setup by an advertiser, the recommendation may be valid only for the time for which the advertiser has paid a subscription.

In some implementations, the third device 325 may revoke the recommendation. In some instances, the third device 325 may revoke the recommendation in whole, or in part. For example, the third device 325 may revoke certain recommendation component that indicate trustworthiness of part of the information sent by the second device. The revocation may be passive, active, or hybrid.

At 326, the third device 325 sends the recommendation to the first device 305. In some instances, the recommendation is sent by a communication interface of the third device 325. The communication interface may be the same as, or different from the one used in receiving the recommendation request (at 322).

At 328, the first device 305 receives the recommendation from the third device 325. In some instances, the recommendation is received by a communication interface of the first device 305. The communication interface may be the same as, or different from the one used in sending the recommendation request (at 320).

At 330, the first device 305 can determine whether to trust the second device 315 based on the recommendation received from the third device 325 (at 328). In some instances, the first device 305 follows the recommendation from the third device 325. In other words, the first device 305 may decide to trust the second device 315 if the recommendation of the third device 325 indicates that the second device 315 is trustworthy; or the first device 305 may decide to not trust the second device 315 if the recommendation of the third device 325 indicates that the second device 315 is not trustworthy.

In some implementations, the first device 305 may use other information in addition to the recommendation from the third device 325 in determining whether to trust the second device 315. As a specific example, the first device 305 may use a threshold. If the recommendation from the third device 325 contains a percentage reliability of the second device 315, the first device 305 may determine whether to trust the second device 315 if the percentage reliability is beyond the threshold. In some instances, the threshold may be a fixed value, or it may be updated or modified from time to time. The threshold can be set up based on, for example, the reputation or reliability of the third device 325 in terms of providing recommendation service. The reliability of the third device may be a fixed value or may change over time as the third device provides the recommendation service.

At 332, the first device 305 may perform one or more additional operations after determining whether to trust the second device 315. In some implementations, if the first device 305 decides to trust the second device 315, the first device 305 can process the information received from the second device 315 (at 316). For example, when the information includes a link (e.g., a URL), the first device 305 can request the resource based on the URL, in response to the recommendation of the third device 325. In some cases, the first device 305 follows instructions contained in the information received from the second device 315 (at 316) or performs other actions. In some implementations, the second device can perform certain actions not directly related to the second device 315. In these cases, the information from the second device 315 acts as a cue for the certain actions of the first device 305.

In some implementations, if the first device 305 decides to not trust the first device, the first device 305 can perform certain actions such as, deleting the information received from the second device 315 (at 316), or enlisting the second device 315 into a blacklist, or stopping receipt of information from the second device 315, or a combination of these and other possible actions.

The example process 300 shown in FIG. 3 includes a recommendation from one trusted authority (the third device 325). In some implementations, the first device 305 can transmit recommendation requests to multiple trusted authorities at 320. The recommendation requests sent to multiple trusted authorities can be identical, similar, or different. The trusted authorities may provide recommendations independently or dependently. In some implementations, the first device 305 can receive multiple recommendations from multiple devices at 328 and make a collective decision based on all or some of the recommendations (at 330) on whether to trust the second device 315.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computing device or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory or both. A computing device typically includes a processor for performing actions in accordance with instructions and one or more memory devices for storing instructions and data. Generally, a computing device will also include, or be operatively coupled to receive data from or transfer data to, or both, one or more storage devices for storing data. However, a computing device need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, subject matter described in this specification can be implemented on a computer having a display device, e.g., an LCD (liquid crystal display) screen for displaying information to the user and a keyboard and a pointing device, e.g., touch screen, stylus, mouse, etc. by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In a general aspect, a first device can determine whether to trust a second device. The determination can be made, for example, based on a recommendation from a trusted authority.

In some aspects, a first wireless device detects proximity of a second wireless device. In response to detecting proximity of the second wireless device, the first wireless device generates a recommendation request based on information received from the second wireless device. The first wireless device sends the recommendation request to a trusted authority and receives a response. The response includes the trusted authority's recommendation whether to trust the second wireless device.

Implementations of these and other aspects can include one or more of the following features. The first wireless device determines whether to trust the second wireless device based on the recommendation. The recommendation includes a binary value indicating to trust the second wireless device; or the recommendation includes a binary value indicating to not trust the second wireless device. The recommendation includes a value indicating a percentage reliability of the second wireless device.

Additionally or alternatively, implementations of these and other aspects can include one or more of the following features. The information from the second wireless device includes a uniform resource locator (URL). In response to the trusted authority's recommendation to trust the second wireless device, the first wireless device requests a resource based on the URL. In response to the trusted authority's recommendation not to trust the second wireless device, the first wireless device deletes the URL.

Additionally or alternatively, implementations of these and other aspects can include one or more of the following features. The recommendation request includes a hash value generated by the first wireless device based on the information. The recommendation request includes location information or time information associated with the second wireless device. The recommendation request is sent to the trusted authority over a wireless communication network, and the response is received over the wireless communication network.

In some aspects, a recommendation request is received from a first device. The recommendation request indicates the first device's request for a recommendation whether to trust a proximity-activated wireless device detected by the first device. Based on the request from the first device, a recommendation whether to trust the proximity-activated wireless device is generated. The recommendation is sent to the first device.

Implementations of these and other aspects can include one or more of the following features. Information in the request is compared to a database of trusted proximity-activated wireless devices, and the recommendation is generated based on the comparison. The database includes information on trusted Near Field Communication (NFC) tags. The information in the request includes a hash value generated by the first device based on a URL received from the proximity-activated wireless device. The information in the request includes location information or time information associated with the proximity-activated wireless device.

Additionally or alternatively, implementations of these and other aspects can include one or more of the following features. The recommendation includes a binary indicator whether to trust the second wireless device. The recommendation includes a percentage reliability of the second wireless device.

Additionally or alternatively, implementations of these and other aspects can include one or more of the following features. The recommendation is generated by a server that is remote from the first device. The request is received from the first wireless device over a wireless network, and the recommendation is sent to the first wireless device over the wireless network.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented verification method comprising:
    at a first wireless device, based on detecting proximity of a second wireless device, generating a recommendation request from information received from the second wireless device, the recommendation request including a hash value generated by the first wireless device based on the information;
    sending the recommendation request from the first wireless device to a trusted authority; and
    receiving, at the first wireless device, a response to the recommendation request, the response including a recommendation of the trusted authority whether to trust the second wireless device.

2. The method of claim 1, further comprising receiving the information from the second wireless device by a Near Field Communication (NFC) interface of the first wireless device.

3. The method of claim 1, wherein the information includes a uniform resource locator (URL).

4. The method of claim 3, further comprising, based on the trusted authority's recommendation, requesting a resource based on the URL.

5. The method of claim 3, further comprising, based on the trusted authority's recommendation, deleting the URL at the first wireless device.

6. The method of claim 1, wherein the recommendation request includes location information associated with detecting the second wireless device.

7. The method of claim 1, wherein the recommendation request includes time information associated with detecting the second wireless device.

8. The method of claim 1, wherein the recommendation includes a binary value indicating either to trust the second wireless device or to not trust the second wireless device.

9. The method of claim 1, wherein the recommendation includes a value indicating a percentage reliability of the second wireless device.

10. A wireless device comprising:
    a communication interface; and
    data processing apparatus operable to:
        based on the communication interface detecting proximity of another device, generate a recommendation request from information received from the other device, the recommendation request including a hash value generated by the first wireless device based on the information;
        send the recommendation request to a trusted authority; and
        determine whether to trust the other device based on a recommendation from the trusted authority, the recommendation received in response to the recommendation request.

11. The wireless device of claim 10, wherein the communication interface includes a Near Field Communication (NFC) interface.

12. The wireless device of claim 10, further comprising a second, different communication interface, wherein the recommendation request is sent to the trusted authority using the second communication interface.

13. The wireless device of claim 10, further comprising a location-detector module operable to generate location information associated with detecting the other device, wherein the recommendation request includes the location information.

14. The wireless device of claim 10, further comprising a clock module operable to generate time information associated with detecting the other device, wherein the recommendation request includes the time information.

15. The wireless device of claim 10, wherein the recommendation includes a binary value indicating either to trust the other device or to not trust the other device.

16. The wireless device of claim 10, wherein the recommendation includes a value indicating a percentage reliability of the other device.

17. A non-transitory computer-readable medium storing instructions that are operable when executed by data processing apparatus to perform operations at a first wireless devices, the operations comprising:

based on detecting proximity of a second wireless device, generating a recommendation request from information received from the second wireless device, the recommendation request including a hash value generated by the first wireless device based on the information;

sending the recommendation request to a trusted authority; and receiving a response to the recommendation request, the response including the a recommendation of the trusted authority whether to trust the second wireless device.

18. The computer-readable medium of claim 17, wherein the information is received from the second wireless device by a Near Field Communication (NFC) interface of the first wireless device.

19. The computer-readable medium of claim 17, wherein the information includes a uniform resource locator (URL).

20. The computer-readable medium of claim 17, wherein the recommendation request includes location information associated with the second wireless device.

21. The computer-readable medium of claim 17, further comprising determining whether to trust the second wireless device based on the recommendation.

\* \* \* \* \*

UNITED STATES PATENT AND TRADEMARK OFFICE
CERTIFICATE OF CORRECTION

| | |
|---|---|
| PATENT NO. | : 9,100,773 B2 |
| APPLICATION NO. | : 13/690001 |
| DATED | : August 4, 2015 |
| INVENTOR(S) | : Robert John Lambert et al. |

Page 1 of 1

It is certified that error appears in the above-identified patent and that said Letters Patent is hereby corrected as shown below:

Claims

In Column 26, In Line 4, In Claim 17, after "including" delete "the".

Signed and Sealed this
Sixteenth Day of February, 2016

Michelle K. Lee
*Director of the United States Patent and Trademark Office*